United States Patent [19]

Dabney

[11] Patent Number: 4,489,264
[45] Date of Patent: Dec. 18, 1984

[54] POWER CONTROL FOR AC MOTOR

[75] Inventor: Richard W. Dabney, Toney, Ala.

[73] Assignee: The United States of America as represented by the Administrator of the National Aeronautics and Space Administration, Washington, D.C.

[21] Appl. No.: 504,345

[22] Filed: Jun. 14, 1983

[51] Int. Cl.³ .............................................. H02P 5/40
[52] U.S. Cl. .................................... 318/729; 318/812
[58] Field of Search ................ 318/729, 812, 798, 806

[56] References Cited

U.S. PATENT DOCUMENTS 3,652,924  3/1972  Dieterich et al. ................... 318/807
4,361,792  11/1982 Davis, Jr. et al. ................... 318/729
4,413,217  11/1983 Green et al. ........................ 318/729

Primary Examiner—David Smith, Jr.
Attorney, Agent, or Firm—Joseph H. Beumer; John R. Manning; Leon D. Wofford, Jr.

[57] ABSTRACT

A motor controller (10) employing a triac (12) through which power is supplied to a motor (18) and wherein the open circuit voltage appearing across the triac (12) controls the operation of a timing circuit which triggers on the triac (12) at a time following turn off which varies inversely as a function of the amplitude of the open circuit voltage of the triac (12).

9 Claims, 2 Drawing Figures

POWER CONTROL FOR AC MOTOR

ORIGIN OF THE INVENTION

The invention described herein was made by an employee of the United States Government and may be manufactured and used by or for the government of the United States of America for governmental purposes without the payment of any royalties thereon or therefor.

TECHNICAL FIELD

This invention relates generally to devices for the control of electrical motors, and particularly to one wherein the power supplied to a motor is varied as a direct function of load.

BACKGROUND OF THE INVENTION

It is well known that idling, or less than fully loaded, motors waste power. Such is particularly true with AC induction motors, and in U.S. Pat. No. 4,052,648, and in others by the same inventor, there have been disclosed devices which substantially reduce motor losses by controlling the power input to a motor as an inverse function of the detected angle between motor voltage and motor current, or as a direct function of power factor. These inventions have been widely publicized and have provided a major improvement in motor controllers.

One possible problem with power factor type controllers is that in order to provide a sufficiently stable control, the control signal must be subjected to signal conditioning which involves the integration or averaging of the signal. This in turn does involve some delay in motor response, particularly where loads are quite suddenly imposed on a motor.

It is the object of this invention to provide a motor controller which both efficiently supplies power to a motor throughout is operating load range and is capable of rapidly responding to increased motor loading.

SUMMARY OF THE INVENTION

In accordance with this invention, an AC motor to be fed power as a function of loading is coupled conventionally, through a bidirectional switch, typically a triac, to a source of AC power. Noting that the back EMF of a motor present when this switch is turned off decreases as a function of loading, the applicant discovered that this effect could be utilized optimumly to control the "on" time of the switch. As one feature of this invention, a signal which is a function of back EMF is obtained by directly sampling the voltage across the bidirectional switch, typically a triac. This voltage is essentially zero when the switch is closed or "on," but when turned "off," it is substantial and representative of the difference between line voltage and back EMF. Thus, there is obtained a switch voltage which rises as a direct function of motor loading. This switch voltage is coupled to circuitry which generates a trigger voltage which turns the switch back "on" after an elapsed time following turn-off of the switch as an inverse function of the amplitude of the voltage across the switch during its turn-off. In this manner, the switch stays on longer with increases in motor loading, as desired.

In accordance with one version of this circuitry an electrical counter is employed which provides the trigger voltage upon the counter being countered up to a selected count, where the rate of counting is a function of the amplitude of the bidirectional switch voltage. Thus, with greater loading, the counting rate is increased to thus shorten the turn-off time and thereby to provide a greater power input to a motor.

DETAILED DESCRIPTION OF THE DRAWINGS

Figure 1:
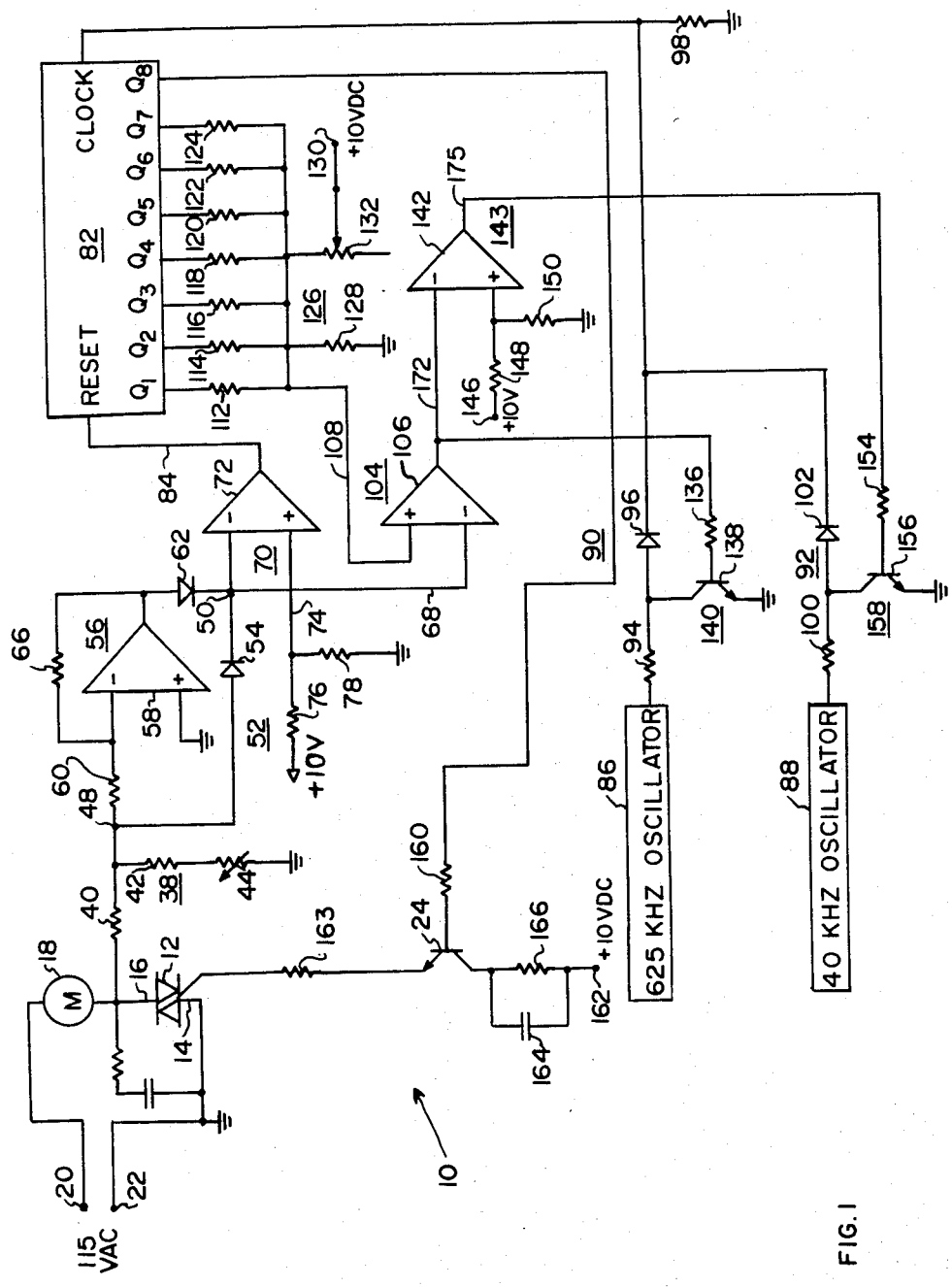
FIG. 1 is an electrical block diagram of an embodiment of the invention.

Referring initially to FIG. 1, a motor controller 10 is constructed with a triac 12 having one of its controller current terminals 14 connected to ground and its other controlled terminal 16 connected to one terminal of induction motor 18. The other terminal of induction motor 18 is connected to one terminal 20 of 115 volts AC line voltage, and the other line voltage terminal 22 is connected to ground. Triac 12 is one example of an electronically controlled bidirectional alternating current switch, and is gated on by a current pulse provided by transistor 24 at a selected point in each half cycle of AC current, as will be described. This turn-on pulse is derived from the voltage appearing across triac 12. The voltage actually appears when triac 12 is turned off and has an amplitude which is the difference between line voltage and back EMF of the motor.

The motor back EMF decreases in response to increasing mechanical loads on motor 18, and thus the open circuit triac voltage (line voltage less back EMF voltage) will increase responsive to increased mechanical loads. This effect is utilized to decrease the time until the next turn-on triac 12 and thus provide power to a motor as needed. It thus follows that with a heavily loaded motor 18, triac 12 is pulsed on early in a half cycle of current flow, allowing more current to be provided to the motor. Conversely, when motor 18 is lightly loaded and there is a lower triac voltage, triac 12 is caused to fire later in each half cycle, applying less power to the motor.

Alternately, back EMF voltages may be derived through switching circuitry which enables the sampling of the voltage across motor 18 precisely when triac 12 is turned off; in which case, the time until a turn-on pulse would be derived as an inverse function of the back EMF voltage.

Figure 2:
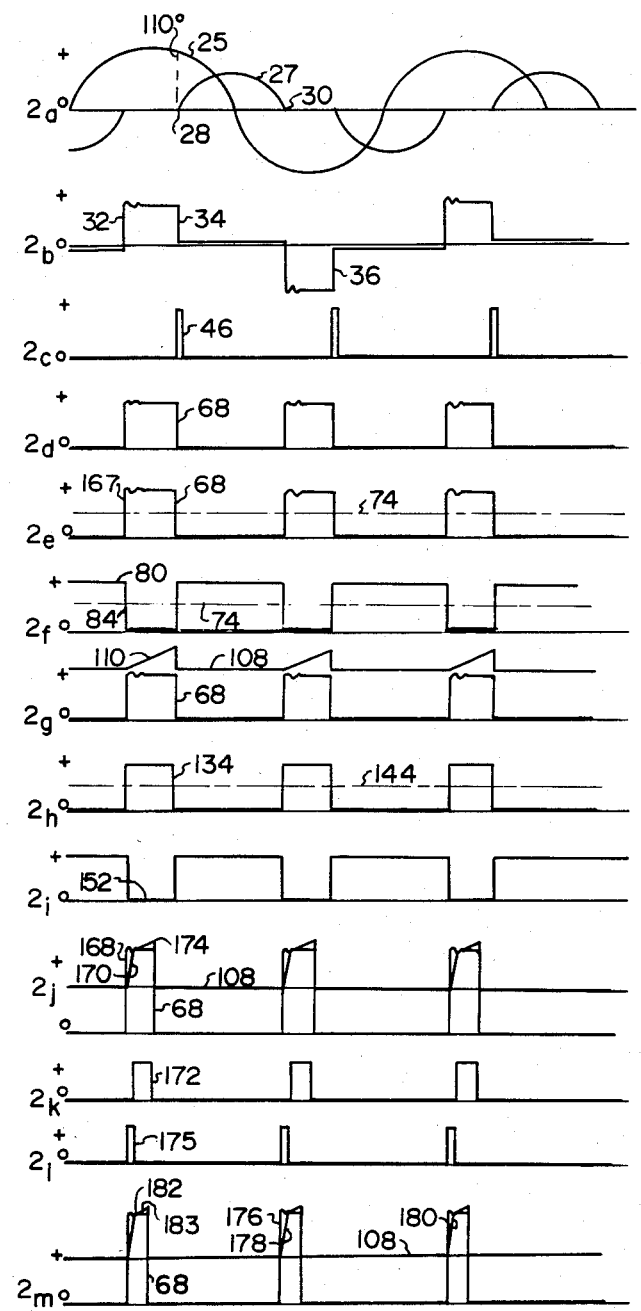
FIGS. 2A-2M are illustrations of electrical waveforms appearing at discrete points in the embodiment of the invention shown in FIG. 1.

FIG. 2A illustrates the relationship between line voltage 25 and motor current 27 for a selected motor loading wherein the motor is relatively lightly loaded, and wherein triac 12 is turned on at a point 28, approximately 110° into each 180° half cycle of alternating current line voltage 25. It is to be observed that with a light load, line current substantially lags in phase (or time) line voltage. The turn-off points 30 of triac 12 are controlled by the point in time when motor current falls to 0, this being an inherent function of the triac.

FIG. 2B is illustrative of the signal voltage 32 appearing across triac 12, between terminal 16 and ground and consisting of positive pulses 34 and negative pulses 36. These pulses are representative of the difference between line voltage 25 and the back EMF voltage generated by motor 18. The pulses coincide in time with portions of the current waveform when the current is zero, which is, of course, the case when triac 12 is turned off.

Voltage pulses 34 and 36 (FIG. 2B) are applied to a voltage divider network 38 (FIG. 1) consisting of resistors 40 and 42 and varible resistor 44. These voltage pulses are employed in the development of trigger pulse 46 shown in FIG. 2C. The first function of the circuitry of FIG. 1 is to effect a full wave rectification of the waveform of FIG. 2B, and this is effected by creating two signal paths between point 48 and point 50. In one of them, path 52, diode 54 is poled to pass positive pulse 34 to point 50 and block negative pulse 36. The other path employs inverter circuit 56 wherein the voltage at point 48 is applied to the inverting input of operational amplifier 58 through resistor 60, and the inverted output of operational amplifier 58 is connected via diode 62, poled to pass only its positive output, to point 50. Since the input to operational amplifier 58 is inverted, this means that positive pulse 34 would become negative and thus be blocked by diode 62, and negative pulse 36 would be inverted, be positive, and passed by diode 62 to point 50. Inverse feedback is applied by resistor 66 from the output to the inverting input of operational amplifier 58, and by selected values for resistor 60 and 66 the gain of operational amplifier 58 is reduced to unity whereby the resulting voltage pulses 68, shown in FIG. 2D, are essentially of equal amplitude and, of course, of the same polarity. Resistors 40, 42 and 44 are used to set the amplitude of signal voltage 32, including both pulses 34 and 36.

Actual triggering "on" of triac 12 is effected by a full count output from output Q8 of eight bit counter 82 wherein counting is commenced each half cycle by the appearance of one of pulses 68 and the pulse reaching a selected threshold level for stable operation. This latter function is accomplished by comparator 70 employing operational amplifier 72. Pulses 68 (FIG. 2E) are applied to the negative input of operational amplifier 72, and a reference voltage 74 is applied through resistor 76 and across resistor 78 to the positive or non-inverting input of operational amplifier 72. Prior to a pulse, the output of operational amplifier 72 is at a positive level 80 (FIG. 2F), and this level is fed to the reset input of counter 82 and holds counter 82 in a reset non-counting state. When a pulse 68 rises above the reference level 74, the output of operational amplifier 72 goes to zero as shown by voltage 84 of waveform 2F. This zero output at the reset input of counter 82 enables counting. Counter 82 then counts responsive to one of two selected frequency signals, these frequencies being 625 KHz and 40 KHz, provided by oscillators 86 and 88, respectively. The selection of one of these signals is effected by gating circuits 90 and 92. When gating circuit 90 is enabled, it provides a positive pulse signal from oscillator 86 at 625 KHz through resistor 94 and diode 96 across resistor 98 to the clock input of binary counter 82. When gating circuit 92 is enabled, it applies a 40 KHz signal from oscillator 88, through resistor 100 and diode 102, across resistor 98, to the clock input of binary counter 82. Depending upon the extent to which one of the gating circuits is operated, and thus the extent to which oscillators 86 and 88 contribute to counting, the time required for binary counter 82 to reach a full count is controlled. The significance of this is that triac 12 is triggered "on" by a full count and thereby the period of conduction of triac 12 each half cycle is controlled.

Gating circuit 90 is directly controlled by comparator 104, it consisting of operational amplifier 106. The rectified output signals 68 (FIG. 2G) from triac 12 are applied to the inverting input, and a digital-to-analog converter voltage output of binary counter 82, plus a selected bias 108, is applied to the non-inverting input of operational amplifier 106 as ramp voltage 110 (FIG. 2G). The analog conversion of the Q1-Q7 outputs is accomplished by connecting one terminal of one of resistors 112-124 of digital-to-analog converter 126 to each of these outputs, and the other terminals of these resistors are connected together to one terminal of summing resistor 128. The other terminal of resistor 128 is connected to ground. As counting occurs, and as each of the Q1-Q7 outputs goes from a logical 0 state to a logical 1 state (e.g, from 0 to 10 volts), a stepped (stepping not shown because of small scale) ramp voltage 110 (FIG. 2G) is generated by virtue of digital-to-analog converter 126. The general slope of the ramp voltage is linear as a direct function of the values of resistors 112-124, wherein each succeeding resistor is one-half value. The range of the ramp voltage is set by resistor 128. In order to set a selected operating level for ramp voltage 110, a further and adjustable current source (other than from counter 82) is provided by supplying a DC bias level from +10 volt terminal 130 through adjustable resistor 132 across resistor 128.

With the DC level 108 of voltage 110 (FIG. 2G) set as shown and the value of signal 68 being less than this level, the output voltage 134, (FIG. 2H) of differential amplifier 106 would be positive. This would be applied through resistor 136 to the base input of NPN transistor 138 of gate 140 and turn it on, shorting out the output of 625 KHz oscillator 88.

At the same time, the positive output 134 of operational amplifier 106 is coupled to the inverting input of operational amplifier 142 of comparator 143, and it is of a level 134 (FIG. 2H) which overcomes a reference voltage 144 applied to the non-inverting input of operational amplifier 142 of comparator 143. This reference voltage is supplied from a +10 volts terminal 146 and applied through resistor 148 and across resistor 150. As a result, a zero, turn-off, voltage 152 (FIG. 2I) appears at the output of comparator 143 and is applied through resistor 154 to the base input of NPN transistor 156 of gate 158. Thereby, transistor 156 is turned off, enabling the 40 KHz output of oscillator 86 to be supplied unimpeded via resistor 100 and diode 102 and across resistor 98 to the clock input of binary counter 82. Accordingly, counter 82 commences counting at the lower, 40 KHz, rate. This rate is illustrated by the contour of ramp waveform voltages 110 in FIG. 2G as appearing across resistor 128.

When counter 82 counts to a full count of 128, the Q8 output of counter 82 moves from a zero state to a positive "1" state (e.g., to a 10 volts postive), and this output is provided through resistor 160 to the base of NPN transistor 24, which turns transistor 24 on. A trigger voltage 46 (FIG. 2C) is supplied from +10 volts terminal 162 through the collector-emitter path of transistor 24 and resistor 163 to the gate input of triac 12, causing it to be turned on. Capacitor 164 across resistor 166 provides an accelerating effect as initially the turn on pulse is effected by the charging of this capacitor without the voltage dropping effect of resistor 166.

In response to the low loading state of motor 18, as indicated by a relatively low value for voltage pulses 68, oscillator 86 totally effects counting over a complete count by counter 82 to cause a maximum delay before the occurrence of a turn-on pulse output from Q8 of counter 82. Typically, the rate of count, 40 KHz in this case, would be such that the turn-on pulse would be provided to triac 12 each cycle at a time no earlier than necessary to sustain operation of a completely unloaded motor.

Assume next that an intermediate load is placed on motor 18. When this occurs, the back EMF across motor 18 will decrease, and thus the line voltage minus back EMF difference voltage across triac 12 will increase. Thus, there occurs an increased rise of leading edge 167 of voltage 68 (FIG. 2E) above bias voltage 74 applied to the non-inverting input of comparator 72. This produces a zero going output pulse 84 (FIG. 2F) from comparator 104, with the result that binary counter 82 is triggered from a reset state to a counting state and commences counting. As a result, there appears across resistor 128 the commencement of a ramp voltage waveform 170 (FIG. 2J), and this ramp waveform is applied to the non-inverting input of operational amplifier 106 of comparator 104. When, as shown, the voltage pulse 68 appearing at terminal 50 and applied to the inverting input of operational amplifier 106 exceeds the voltage 170 across resistor 128 applied to the non-inverting input, the output 172 of operational amplifier 106 becomes zero (FIG. 2K). This holds transistor 138 off, enabling the output of 625 KHz oscillator 88 to be applied to the clock input of counter 82. At the same time, by virtue of this zero voltage applied to the inverting input of operational amplifier 142, the latter outputs a positive voltage 175 (FIG. 2L) which turns on transistor 156, causing the 40 KHz path to counter 82 to be blocked. As a result, the slope of the initial portion of ramp waveform 170 rises steeply, this occurring until the ramp waveform output 170 exceeds that of leading edge voltage 168, whereupon the output of operational amplifier 106 goes positive. This turns on transistor 138, shorting out the output of oscillator 86. At the same time, operational amplifier 142 outputs a zero voltage, turning off transistor 156 and the 40 KHz rate of triggering reoccurs. As a result of this partial contribution of counting pulses at the higher rate, the ramp waveform is shortened in time and as binary counter 82 reaches a full count at an earlier time point 174, shown by waveform 2J. At this point, the full count output of output Q8 of binary counter 82 triggers transistor 24 to turn on triac 12. This indicates that with increased loading, triac 12 is turned on earlier to thus provide increased average power to motor 18.

FIG. 2M illustrates the operation of the applicant's system wherein a still greater load is applied to motor 18 and wherein the rectified voltage pulses 68 derived from across triac 12 are greater. Thus, leading edge 176 (FIG. 2M) crosses, exceeds, the value of the voltage 178 from resistor 128 at the time of initiation of ramp 180. Accordingly, the output of comparator 104 initially causes counter 82 to be steppd at the 625 KHz rate as represented by the initial slope 180 of ramp or ramp voltage 178. Assuming, as shown, that during the period of this same pulse 68, marking a turn-off period of triac 12, that the ramp voltage once again exceeds, at point 182, the value of voltage 68, then the output of comparator 104 switches to a positive level, shorting out the output of oscillator 86 and enabling counter 82 to be stepped by the lower frequency output of oscillator 88 as reflected by the slope 183 of the latter portion of ramp voltage 178. Of course, if this change did not occur during the off period of triac 12, then oscillator 86 would have supplied counting pulses to counter 82 for the entire period, and the slope of ramp voltage 178 would have continued at its initial slope 180, causing the turn-on of triac 12 essentially instantaneously following turn-off.

Actually, as voltage pulses increase to maximum with maximum loading of motor 18, the period of turn-off would be essentially 0. Accordingly, in practice, the slope of ramp voltage 178 would actually be steeper than as shown, it being shown at a lesser slope merely as a matter of illustration.

A further point is that although the leading edge of the rectified voltage outputs of triac 12 are shown to be aligned in time throughout the figures, actually, as motor current would become more in phase with voltage with increased loading, both the rectified voltage outputs from triac 12 and ramp portions of the voltage across resistor 128 would move to the left.

The operational amplifiers are operated with only a plus voltage bias, and thus only a single polarity power supply is required for the entire circuit.

From the foregoing, it is to be appreciated that the present invention provides an improved system of detection of motor loading conditions and for varying the duty cycle of power applied to a motor. The system does not require filtering of control signals and thus is capable of providing quite fast response to sudden increases in motor loading.

I claim:

1. A power control for an AC induction motor comprising:
    switching means having a pair of switched terminals and a gate input responsive to an input signal for interconnecting, and thereby closing, said switched terminals;
    an AC induction motor connected in series with said switched terminals of said switching means and a source of AC power;
    voltage sensing means connected across said switched terminals of said switching means for providing a signal voltage which, when said switching means is in an open state, is a difference voltage, being a function of the difference between the motor voltage and line voltage;
    timing means responsive to said signal voltage for developing a control signal spaced in time after the commencement of said difference voltage and including means responsive to the amplitude of said signal voltage for adjusting the length of time between said commencement and the occurrence of said control signal as an inverse function of the amplitude of said signal voltage; and
    signal means responsive to said control signal for providing a gating signal to said gate input of said switching means upon the occurrence of said control signal,
    said timing means comprising:
    counting means, having a counting input and a selected count output connected to said signal responsive means, for providing said control signal;
    signal generating means for generating at least a first frequency signal and a second, higher frequency signal; and
    frequency control means coupled to said signal generating means and to said voltage sensing for providing, responsive to said difference voltage, a frequency signal from said signal generating means to said counting input of said counting means which is a direct function of the amplitude of said difference voltage, whereby the time between turn off and turn on of said switching means is decreased as a direct function of said difference voltage.

2. A motor control as set forth in claim 1 wherein:
said counting means includes means for providing a signal output which is of an amplitude which is a direct function of the count of said counting means;
said signal generating means comprises a first oscillator having as an output said first frequency signal, and a second oscillator having as an output said second frequency signal; and
said motor control including second switching means responsive to said signal output of said counting means, and the amplitude of said difference voltage for coupling the output of said first oscillator to said counting input of said counting means when said difference voltage is less than said signal output of said counting means and for coupling the output of said second oscillator to said counting input of said counting means when the amplitude of said difference voltage is greater than said signal output of said counting means.

3. A motor control as set forth in claim 1 wherein said switching means is a triac.

4. A motor control as set forth in claim 3 further compricing rectification means coupled to said switched terminals and responsive to said voltage across said switched terminals for providing as said difference voltage a like polarity voltage each half cycle of AC power.

5. A power control for an AC induction motor comprising:
switching means having a pair of switched terminals and a gate input responsive to an input signal for interconnecting, and thereby closing, said switched terminals;
and AC induction motor connected in a series between a terminal of said switching means and a source of AC power;
signal sensing means connected in circuit with said motor for providing a signal voltage which is a function of motor voltage when said switching means is in an open switch state;
timing means responsive to said signal voltage for developing a control signal spaced in time after the occurrence of said signal voltage and including means responsive to the amplitude of said signal voltage for adjusting the length of time between said occurrence and the development of said control voltage as a function of the amplitude of said signal voltage; and
signal means responsive to said control signal for providing a gate signal to said gate input of said switching means upon the occurrence of said control signal,
said timing means comprising:
counting means, having a selected count output, a reset input, and a count input, for producing said control signal;
signal generating means for generating at least a first frequency signal and a second higher frequency signal; and
frequency control means, coupled to said signal generating means and said voltage sensing means, for providing, responsive to said signal voltage, a frequency signal from said frequency generating means to said counting input of said counting means which is a function of the amplitude of said signal voltage, whereby the time between turn off and turn on of the switching means is a direct function of said signal voltage.

6. A power control as set forth in claim 5 wherein said switching means comprises a triac.

7. A controller that provides power to a motor as a function of motor loading, comprising:
electronic switching means adapted to connect an A-C power line to a motor which is to be controlled,
said electronic switching means adapted to switch on for conduction between the A-C power line and said motor in response to a trigger signal and switch off when the current ceases to flow,
voltage sensing means connected across the terminals of said switching means for providing a signal voltage which when said switching means is off is a difference voltage between said A-C line voltage and the back electromotive force of the motor,
timing means responsive to said signal voltage for developing a control signal spaced in time after the commencement of said difference voltage and including means responsive to the amplitude of said signal voltage for adjusting the length of time between said commencement and the occurrence of said control signal as an inverse function of the amplitude of said signal voltage, and
signal means responsive to said control signal for providing a trigger signal to said electronic switching means for switching on for power conduction to the motor,
said timing means comprising:
counting means having a counting input and a selected count output;
generating means for generating at least a first frequency signal and a second, higher frequency signal;
frequency control means coupled to said generating means and to said voltage sensing means for providing, responsive to said difference voltage, a frequency signal from said generating means to said counting input of said counting means which is a direct function of the amplitude of said difference voltage, whereby the time between switching off and switching on of said switching means is decreased as a direct function of said difference voltage.

8. A controller as set forth in claim 7, further comprising:
rectification means coupled to the electronic switching means and responsive to said voltage across the terminals of said switching means for providing as said difference voltage a like polarity voltage each half cycle of A-C power.

9. A controller as set forth in claim 7 wherein:
said electronic switching means is a triac.

* * * * *